United States Patent Office 3,292,205
Patented Dec. 20, 1966

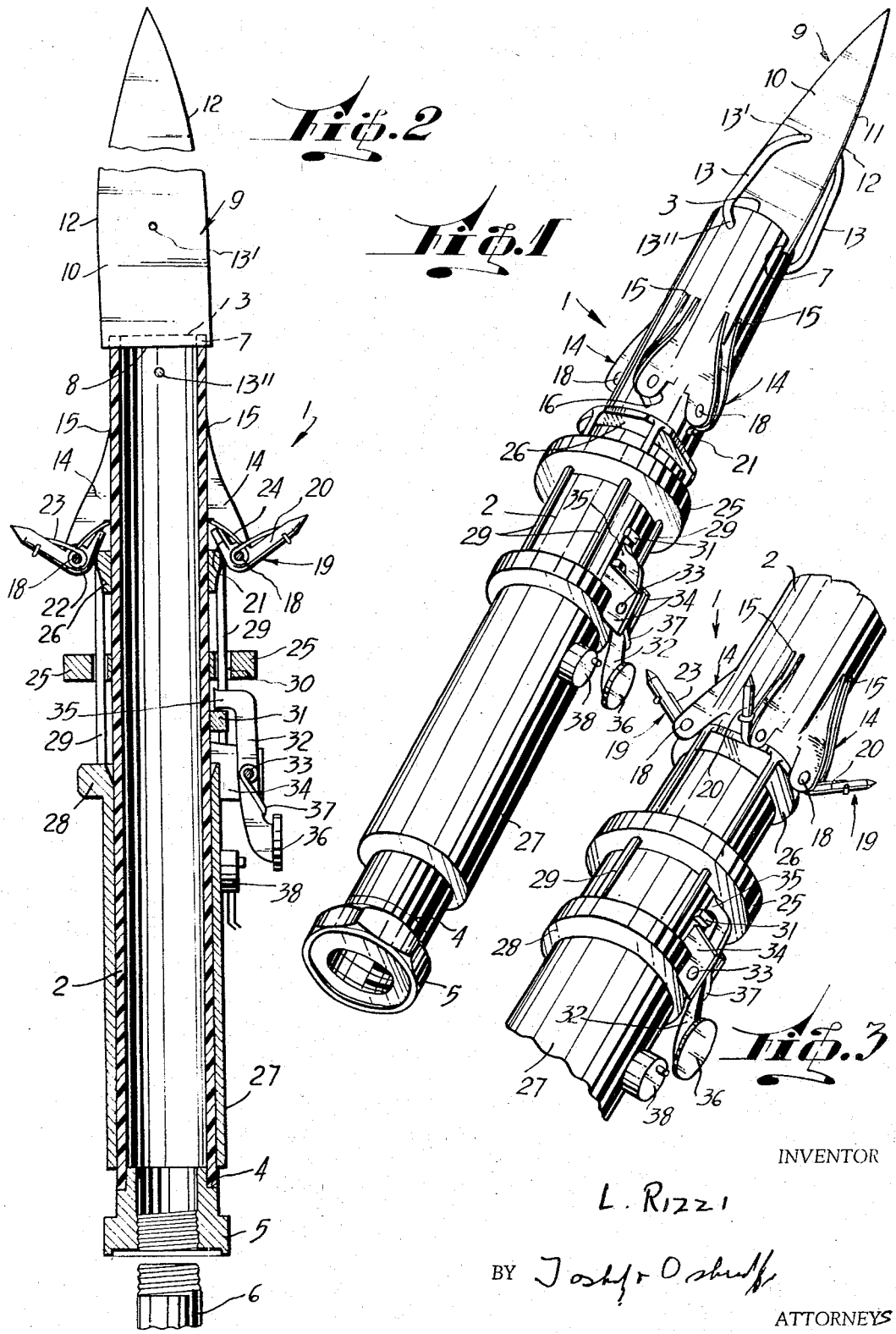

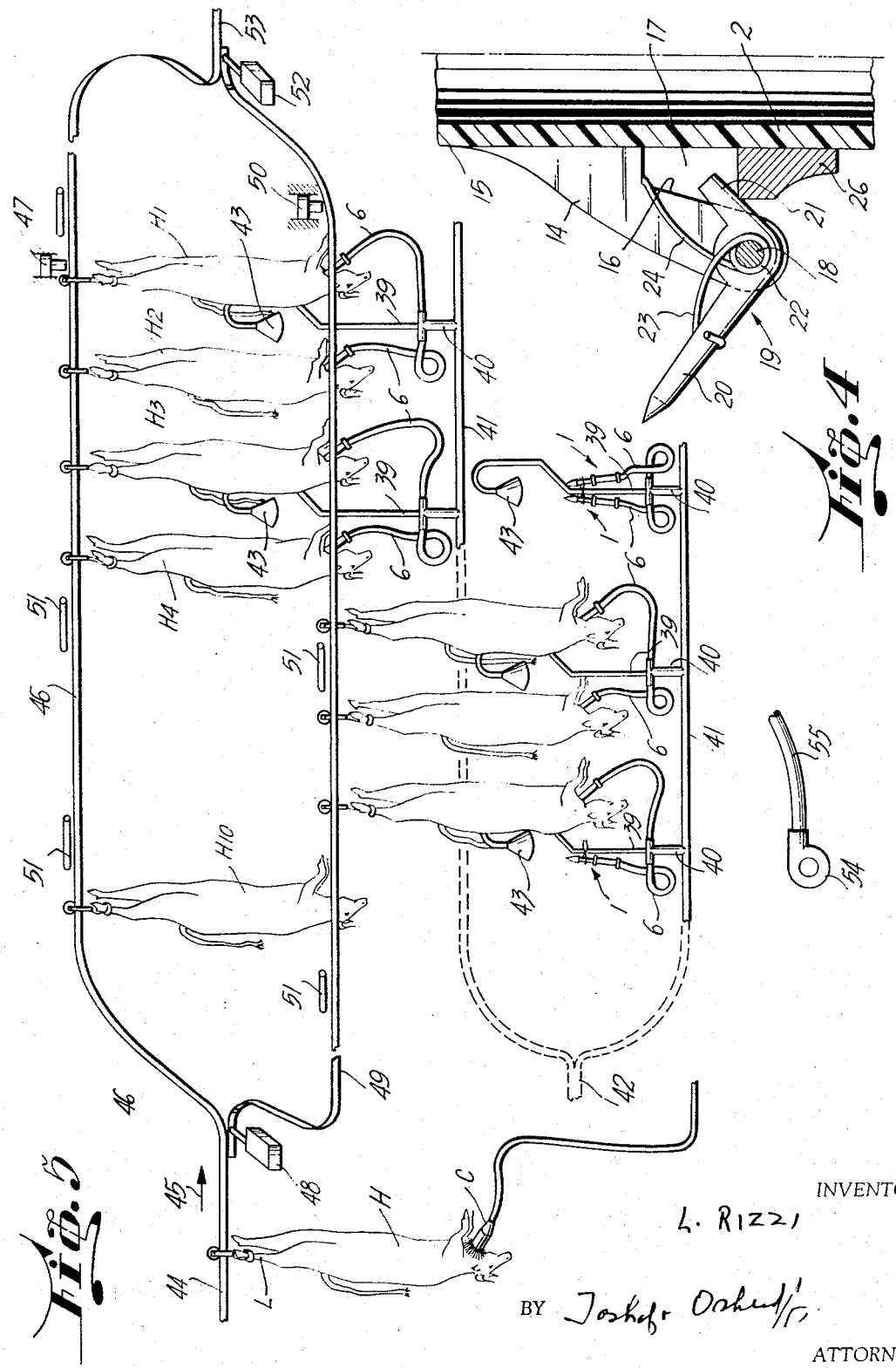

3,292,205
COMBINED SLAUGHTERING AND BLOOD
EXTRACTION DEVICE
Luis Rizzi, 1584 Tucuman St., Buenos Aires, Argentina
Filed June 17, 1964, Ser. No. 375,759
14 Claims. (Cl. 17—1)

This invention relates to a combined slaughtering and blood extracting device for extracting and recovering blood from animals at the instant of slaughtering, particularly from bovines, porcines and echini to be used for instance in the manufacture of sausages and other food, as well as in the chemical and pharmaceutical fields. The present invention enables to increase the speed of slaughtering and blood recovering with regard to the systems so far used.

It is well known that in the slaughtering process one of the steps consists in cutting the jugular vein to allow the bleeding, which is usually performed by simply cutting the throat and said jugular vein, with a long knife. Below the slaughtered animal there is some kind of a blood collecting tray, which blood is to be further used. However, this procedure requires complicated further processing of the collected blood, due to the fact that at the moment of the slaugtering and cutting the jugular vein, vomiting takes place, and in many circumstances it cannot be avoided that the vomit is collected in the same tray as the blood.

It has recently been suggested to use a knife mounted on a tubular handle, so that when the slaughterman cuts the throat and thereafter the jugular vein, he can retain the tubular handle of the knife against the cut vein, to drain the blood. This is, however, a very primitive procedure, because the slaughterman has to press the tubular handle against said cut vein during approximately 80 seconds if bovine animals are slaughtered, bearing in mind that such an animal has approximately 15 to 20 litres of blood. Since the animal is head downwardly hanging from one of its hind legs, from a conveyor, when using this procedure it will be evident that there is always a slight swinging movement of the carcass and the slaughterman has to synchronize the movement of his arm with said swinging movement, to maintain a reasonable sealed connection, to assume that the blood will be drained through the tubular handle.

In practice, this has proved to be only a part-solution and furthermore the speed of the slaughtering is considerably decreased, because in theory such a slaughterman could only slaughter round about 45 animals per hour. In practice however, the number is still more decreased because of the tiring effect on the slaughterman's arm who has to maintain the tubular member sealingly pressed against the cut jugular vein.

According to the present invention, it is possible for one slaughterman to slaughter 200 and more animals per hour, without being subject to all the drawbacks hereinabove mentioned.

According to the present invention, a combined slaughtering and blood extracting device is provided which requires that the slaughterman only makes an incision in the throat to advance the device towards the jugular vein, which is easily cut and thereafter said device, by simply pressing a button, is anchored within the throat in such a position that the cut jugular vein and fleshy surrounding portion is sealed to the tubular member, which at the same time is subject to a suction force.

Thus, the device of the present invention will freely swing with the carcass and carry out the extraction in about 40 to 50 seconds, at the same time as the slaughterman is already able to carry out the steps of cutting the throat and jugular vein on the next animal.

It will therefore be seen that the tiring step of retaining the slaughtering and blood extracting device in sealing position by the slaughterman is avoided.

More particularly, the cutting device of the present invention is used in a method of extracting and recovering blood from animals at the instant of slaughtering, comprising the steps of forming an incision in the animal's throat with a tool including a cutting device and a suction member, and advancing thereafter the tool towards the jugular vein and further opening the incision by wedging action. As the forward movement of the tool takes place, the slaughterman will be able to cut said jugular vein, and to compress the fleshy portion surrounding said incision between said jugular vein and the outside of said throat around said suction member to define a seal between said suction member and said fleshy portion. At the same time he will anchor the tool within said throat, and to suction the blood out of the animal and thereafter said tool may be withdrawn from said throat.

The present invention more particularly refers to a combined slaughtering and blood extracting device, comprising a tubular member having a first open end and a second open end, a vein cutting blade mounted on said first open end and projecting away therefrom, anchoring means for anchoring said tubular member within a cut throat of an animal under slaughter procedure, said anchoring means being reciprocably mounted on said tubular member adjacent said first open end, means for position controlling said anchoring means, and said second open end being connectable to a suction source.

To facilitate the comprehension of the present invention, reference will now be made to a specific embodiment by way of example, in relationship to the accompanying drawings, wherein:

FIG. 1 is a perspective view of a combined slaughtering and blood extracting device, in inoperative position, according to the present invention.

FIG. 2 is a longitudinal section of the device shown in FIG. 1.

FIG. 3 is a detail, in perspective view of the device shown in FIG. 1, but with the anchoring means in operative position.

FIG. 4 is a detail in side elevation, partially in longitudinal section, of the anchoring means shown in operative position.

FIG. 5 is a layout of a plant for slaughtering bovines and extracting and recovering the blood from the animals.

As may be seen in FIGS. 1 and 2, the combined slaughtering and blood extracting device 1 of the present invention consists in a tubular member 2 having a first open end portion 3 and a second open end portion 4 to which a coupling nut 5 is sealed which enables the connection of the latter to a hose 6 (FIG. 2) which in turn is connected, as will be later explained, to a suction source. The tubular member 2 is preferably of circular cross-section and has a diametrical slot 7 in which the rear end portion 8 of an ogive shapped-cutting blade 9 is stationarily mounted. The cutting blade 9 is a flat blade, having the faces 10 and 11. Each of the side edges of the cutting blade 9 defines a cutting edge 12. The cutting blade 9 divides said first open end portion 3 into two halves which, as will be later apparent, form the mouth through which the blood is to be drained by suction. A pair of rod-like wedge bracket members 13, each having a front end portion 13', is linked to one of said faces 10, 11 of said blade 9 at an intermediate portion thereof, and a rear end portion 14" each of which is linked to one of said halves of said first end portion 3. The pair of rod-like wedge bracket members 13 define a plane (not shown) substantially perpendicular to the plane (not shown) defined by said blade. Thus, it can already be appreciated that when the slaughterman performs a cut in the throat of an animal by means of the front portion of the cutting blade 9, upon further pushing said cutting blade into the animal's throat, the walls defined by the incision or cut are distended by means of the wedge bracket members 13. Since the slaughterman has to advance deeper into the throat, than is the length of said wedge bracket members 13, the walls defining said incision will slide behind said rear end portion 13" and have a tendency to contract on the cylindrical portion of said tubular member 2. The contraction is due to the fact that the animal is just being slaughtered and therefore the fleshy portions have the tendency to close the incision.

The tubular member 2 is further provided in this embodiment with four double walled angularly spaced wedge-shaped brackets 14. Each of said wedge-shaped brackets 14 has a wedging point 15 and a recessed rear end 16 (see also FIG. 4) which is spaced apart from the outer surface of the pertinent portion of the tubular member 2. These brackets 14 being mounted on the tubular member 2 adjacent said first end portion with their wedging points 15 directed towards said first open end portion 3. The recessed rear ends 16 define a cam inlet channel 17 with said tubular member. Each of said double-walled wedge-shaped brackets 14 support at their rear ends a pivot 18, in turn pivotally or reciprocally supporting an L-shaped rod-like anchoring member 19. Each anchoring member 19 has a long, pointed branch 20 and a short cam operated branch 21. The pivot 18 passes through the confluence of said long and short branches 20, 21. The short branch 21 enters said cam inlet channel 17. A helical spring 22 is coiled on said pivot and has one end leg 23 hooked to said long branch 20, while the other end leg 24 is hooked to the wedge-shaped bracket 14, as clearly shown in FIG. 4, thereby tending to house said long branch 20 within its double walled wedge-shaped bracket 14, when in inoperative position, as shown in FIG. 1.

An annular presser plate 15 (see FIGS. 1 and 2) is stationarily mounted on said tubular member 2 behind said brackets 14. A collar cam 26 is slidably mounted on said tubular member 2 between said annular passer plate 25 and said wedge-shaped brackets 14. A bushing handle 27 is slidably mounted on said tubular member 2 between said rear end portion 4 and said presser plate 25. The front end of said bushing-handle 27 has an annulus 28 supporting four angularly spaced rod-shaped linking members 29, passing through pertinent perforations 30 (see FIGS. 2) of said annular presser plate 25. The linking members 29 are furthermore connected to said collar cam 26. Upon moving said bushing-handle 27 from the position shown in FIG. 1 towards the first open end portion 3, i.e., the position shown in FIG. 2, the collar cam 26 will enter said inlet channel 17, thereby urging on said short branches 21 and rotating said L-shaped anchoring members 19 in counterclockwise direction about their pivots 18, as best shown in FIG. 4. A latch block 31 is mounted on the portion of the tubular member 2 existing between said annular presser plate 25 and said annulus 28. The latch-block 31 cooperates with a manually operable latch lever 32, pivotally supported by pivot 33 on a bracket 34 integral with said annulus 28. The front end portion of said latch lever 32 is defined by a downwardly inclined nose 35 and the rear end portion of said lever 32 is defined by a push-buttom 36. To move the bushing-handle 27 forward in order to open the anchoring members 19, it is necessary to press down the push-button 36 to rise the nose 35 above the latch-block 31.

Once the forward movement has been completed, the nose 35 is allowed to rest in front of the latch block 31, as shown in FIG. 2 and 3. A helical spring 37 (see FIG. 2) is coiled on the pivot 33 which tends to rise the push-button 36. A switch 38 of known structure, is arranged below said push-button 36, so that each time said push button 36 is pressed down, a signal is emitted towards a suction source (not shown) which once establishes a connection with hose 6 and the next time shuts off said connection.

The arrangement is so timed that when the push-button 36 is pressed down, to move the bushing-handle 27 forward, the suction source is connected to the hose 6. The force exerted by the helical springs 22 cooperates, upon releasing the nose 35 from the latch block 31, when the anchoring members 19 are in the anchoring position, to restore the assembly to the inoperative position.

As may be seen in FIG. 5, each pair of combined slaughtering and blood extracting devices 1 which are connected to hoses 6 are supported, in inoperative position by a column 39, mounted on a pipe 40 to which the other ends of the two hoses 6 are coupled. Each pipe 40 is connected to a collecting pipe 41 ending in a collecting manifold 42, the other end of which leads the collected blood towards a blood treating station (not shown since is does not form part of the invention).

Each column 39 supports by its upper end a sterilization lamp 43 which is adapted to project its sterilization rays onto said slaughtering and blood extracting devices, when in inoperative position.

In the assembly shown in FIG. 5, cows are supplied on a conveyor rail 44 by hanging the cows H in head-downward position from one of its hind legs L, to pass by a cleaning station C where the throat portion, where the incision is to be made, is cleaned. The cleaned cows are then moved forward in the direction indicated by arrow 45. When the slaughtering is started, the first animals will be moved along a first track 46 until abutting against a removable stop 47 and the following animals are then lined up on said first track 46, such as identified by H1, H2, H3, H4. When the first track 46 is completely filled up, such as up to the position shown by H10, the junction operating device 48 will be operated to side branch the next incoming cows onto a second track 49, where there is also a similar removable stop 50 as stop 47, so that then said second track may be filled with cows. In order to make the drawing clearer, the first cows on track 49 are not shown.

Above the tracks 46 and 49, additional sterilization lamps 51 are provided. The first track 46 and second track 49 are again linked together by means of a junction operating device 52, so that as the stops 47 and 50 are withdrawn, as will be later explained, the bleeded cows will move along the conveyor rail 53.

A source of compressed air 54 connected to a cleaning hose 55 (only schematically shown) may be provided for purposes which will be later explained.

As to the method of extracting and recovering blood from animals at the instant of slaughtering, after the throat of each animal has been cleaned by cleaning station C and the animals have reached to a stop either on the first track 46 or on the second track 49, the extracting operation may be started. To this end what is usually done is that the slaughterman first starts to cut the throat of the first cow H1 by means of the cutting blade 9 which is then pushed forward to find the jugular vein and cut the latter. During that pushing forward action, the outside end of the incision will first move and be distended along the wedge bracket members 13 to then close on the first open end portion 3 and as the slaughterman moves the instrument further forward, the incision is again reopened when sliding along the double walled wedge-shaped brackets 14, until reaching the front face of the annular presser plate 25. At this instant, the slaughterman will press down the push-button 36 and further push forward the bushing-handle 27 along the tubular member 2, whereby the anchoring members 19 are opened entering into the fleshy portion of the throat, at the same time as the fleshy portion is being compressed onto the front face of the annular presser plate 25, thereby establishing a good seal. Simultaneously, when the nose 35 is lowered in front of the latch block 31 as shown in FIG. 2, the suctioning has started. Thus, the blood is discharged from the just slaughtered animal through the open end portion 3, tubular member 2, hose 6 and pertinent collecting pipe 41, towards the collecting manifold 42. As soon as the instrument is located in place, the slaughterman can start with a similar procedure on cow H2 and so on until reaching cow H10 to then start with the first cow on the second track 49.

As soon as the blood extraction has been finished, preferably another operator presses again push-button 36 whereby the helical springs 22 will tend to push the bushing-handle 27 backward, towards the second open end portion 4 which action is cooperated by the extracting step of the tool itself.

Due to this new operation of the push-button 36, the suctioning is stopped for that tool, which is hung onto the pertinent column 39 and thus subject to the sterilization rays of lamp 43. The pertinent stop 47, 50 is then withdrawn, to allow the cows to be moved forward towards conveyor rail 53.

If it should become necessary, hose 55 will be used for ejecting air onto the extracting devices for cleaning them to remove any solid or liquid remanents of blood, meat, cartilages, tissues, fat and the like. It is advisable to use air for that operation to avoid emollition.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:
1. A combined slaughtering and blood extracting device, comprising a tubular member having a first open end and a second open end, a vein cutting blade mounted on said first open end and projecting away therefrom, anchoring means for anchoring said tubular member within a cut throat of an animal under slaughter procedure, said anchoring means comprising angularly spaced wedge-shaped brackets on said tubular member adjacent said first open end, said wedge-shaped brackets having wedging points directed towards said first open end and anchoring members pivotally supported by said wedge-shaped brackets and adapted to be housed within and projecting out of said wedge-shaped brackets, means for position controlling said anchoring members, and said second open end being connectable to a suction source.

2. The combined slaughtering and blood extracting device as claimed in claim 1, wherein each of said wedge-shaped brackets is a double walled bracket having a recessed rear end defining a cam inlet channel, said anchoring member is an L-shaped rod-like anchoring member having a long branch and a short cam operated branch, said long branch being housable within said double wall wedge-shaped bracket and said short cam operated branch projecting into said cam inlet channel, said means for position controlling said anchoring members including a slidable collar cam adapted to reciprocate on said tubular member and capable of entering said cam inlet channel to act on said short cam operated branches.

3. A combined slaughtering and blood extracting device, comprising a transparent tubular member having a first open end portion and a second open end portion, a pointed flat double edge two faced vein cutting blade mounted on said first open end portion and axially projecting away therefrom, said cutting blade having an intermediate portion, said blade dividing said first open end portion into two halves, a pair of rod-like wedge bracket members each having a front end portion and a rear end portion, the rear end portions being each linked to one of said halves of said first end portion and the frond end portions being each linked to one of said faces of said blade at said intermediate portion, said pair of rod-like wedge bracket members defining a plane substantially perpendicular to the plane defined by said blade, four angularly spaced-wedge-shaped brackets, each having a wedging point, and a recessed rear end, said brackets being mounted on said tubular member adjacent said first open end portion with their wedging points directed towards said first open end portion, a cam inlet channel defined between said recessed rear ends and said tubular member, four L-shaped rod-like anchoring members, each having a long pointed branch and short cam operated branch, a pivot passing through the confluence of said long and short branches of each anchoring member, each of said pivots being journalled in one of said brackets, each of said long branches being housable within its bracket and adapted to project substantially perpendicularly away therefrom, said cam operated branches projecting into said cam inlet channel, spring means mounted on said pivots and resiliently retaining said long branches in said brackets, an annular presser-plate stationarily mounted on said tubular member between said brackets and said second end portion, a collar cam slidably mounted on said tubular member between said annular presser-plate and said wedge-shaped brackets, a bushing-handle slidably mounted on said tubular member between said rear end portion and said presser-plate, linking members passing through said presser-plate and linking said collar cam with said bushing-handle, said collar cam being adapted to enter said inlet channel to cam said cam operated branches for swinging said long branches out of said wedge-shaped brackets, latch means on said bushing-handle adapted to block said bushing-handle in a first position, wherein said collar cam is within said inlet channel and a second position wherein said collar cam is withdrawn from said inlet channel, a suction source connectable to said second open end portion, and control means in operative relationship with said latch means for connecting said suction source to said second end portion when said collar cam is within said inlet channel and to disconnect said suction source from said second end portion when said collar cam is withdrawn from said inlet channel.

4. The combined slaughtering and blood extracting device as claimed in claim 3, wherein said transparent tubular member is of circular cross-section and said first open end portion has a diametrical slot, said vein cutting blade having a rear end portion, said rear end portion being stationarily mounted in said diametrical slot.

5. The combined slaughtering and blood extracting device as claimed in claim 3, wherein said wedging points of said wedge-shaped brackets are spaced apart from said first open end portion, whereby said tubular member includes a cylindrical portion between said first open end portion and said wedging points.

6. The combined slaughtering and blood extracting device as claimed in claim 3, wherein said wedge-shaped brackets are double walled wedge-shaped brackets, said long pointed branch of each of said L-shaped rod like anchoring members being adapted to be housed within said double walled wedge-shaped brackets.

7. The combined slaughtering and blood extracting device as claimed in claim 3, wherein an annulus facing said presser plate is integral with said bushing-handle, said linking members are connected to said annulus.

8. The combined slaughtering and blood extracting device as claimed in claim 7, wherein said latch means comprise a bracket mounted on said annulus, a manually operatble latch lever pivotally mounted on said bracket, said latch lever having two ends, a nose on one of said ends and a push-button on the other of said ends, a latch block mounted on said tubular member between said annulus and said presser plate, said nose being adapted to enter in latching relationship with said latch block to maintain said L-shaped rod-like anchoring members with their long pointed branches projecting out of said wedge-shaped brackets, and a switch arranged below said push-button and operable thereby, said switch forming part of said control means.

9. A combined slaughtering and blood extracting device, comprising a tubular member having a first open end portion and a second open end portion, a two faced vein cutting blade mounted on said first open end portion and axially projecting away therefrom, said cutting blade having an intermediate portion, said blade dividing said first open end portion into two equal halves, a pair of rod-like wedge bracket members each of which is linked to one of said halves of said first end portion and to said intermediate portion, said pair of rod-like wedge bracket members defining a plane at an angle to the plane defined by said blade, angularly spaced wedge-shaped brackets, each having a wedging point, and a recessed rear end, said brackets being mounted on said tubular member adjacent said first open end portion with their wedging points directed towards said first open end portion, a cam inlet channel defined between said recessed rear ends and said tubular member, L-shaped rod-like anchoring members, each having a long branch and short cam operated branch, a pivot passing through the confluence of said long and short branches of each anchoring member, each of said pivots being journalled in one of said brackets, each of said long branches being housable within its bracket and adapted to project substantially out therefrom, said cam operated branches projecting into said cam inlet channel, an annular presser-plate stationarily mounted on said tubular member between said brackets and said second end portion, a colar cam slidably mounted on said tubular member between said annular presser-plate and said wedge-shaped brackets, a bushing-handle slidably mounted on said tubular member between said rear end portion and said presser-plate, linking members linking said collar cam with said bushing-handle, said collar cam being adapted to enter said inlet channel to urge said cam operated branches for swinging said long branches out of said wedge-shaped brackets, latch means on said bushing-handle adapted to block said bushing handle in a first position, wherein said collar cam is within said inlet channel and a second position wherein said collar cam is withdrawn from said inlet channel, a suction source connectable to said second open end portion, and control means in operative relationship with said latch means for connecting said suction source to said second end portion when said collar cam is within said inlet channel and to disconnect said suction source from said second end portion when said collar cam is withdrawn from said inlet channel.

10. A combined slaughtering and blood extracting device, comprising a tubular member having a first open end portion and a second open end portion, a flat double edge two faced vein cutting blade mounted on said first open end portion and projecting away therefrom, said cutting blade having an intermediate portion, said blade dividing said first open end portion into two halves, a pair of rod-like wedge bracket members each having a front end portion and a rear end portion, the rear end portions being each linked to one of said halves of said first end portion and the front end portions being each linked to one of said faces of said blade at said intermediate portion, said pair of rod-like wedge bracket members defining a plane substantially perpendicular to the plane defined by said blade, anchoring means for anchoring said tubular member within a cut throat of an animal under slaughter procedure, said anchoring means being reciprocably mounted on said tubular member adjacent said first open end portion, means for position controlling said anchoring means, and said second open end portion being connectable to a suction source.

11. A combined slaughtering and blood extracting device, comprising a tubular member having a first open end portion and a second open end portion, a vein cutting blade mounted on said first open end and projecting away therefrom angularly spaced wedge-shaped brackets, each having a wedging point, and a recessed rear end, said brackets being mounted on said tubular member adjacent said first open end portion with their wedging points directed towards said first open end portion, a cam inlet channel defined between said recessed rear ends and said tubular member, L-shaped rod-like anchoring members, each having a long branch and short cam operated branch, a pivot passing through the confluence of said long and short branches of each anchoring member, each of said pivots being journalled in one of said brackets, each of said long branches being housable within its bracket and adapted to project substantially away therefrom, said cam operated branches ending in said cam inlet channel, spring means mounted on said pivots, resiliently retaining said long branches in said brackets, annular presser-plate stationarily mounted on said tubular member between said brackets and said second end portion, a collar cam slidably mounted on said tubular member between said annular presser-plate and said wedge-shaped brackets, a bushing-handle slidably mounted on said tubular member between said rear end portion and said presser-plate, linking members linking said collar cam with said bushing-handle, said collar cam being adapted to enter said inlet channel to urge said cam operated branches to swing said long branches out of said wedge-shaped brackets, means for position controlling said bushing-handle on said tubular member and said second open end being connectable to a suction source controlled by said means for position controlling said bushing-handle.

12. A combined slaughtering and blood extracting device, comprising a tubular member having a first open end portion and a second open end portion, a flat two faced vein cutting blade mounted on said first open end portion and projecting away therefrom, said cutting blade having an intermediate portion, said blade dividing said first open end portion into two halves, at least a pair of wedge bracket members each having a front end portion and a rear end portion, the rear end portions being each linked to one of said halves of said first end portion and the front end portions being each linked to one of said faces of said blade at said intermediate portion, anchoring means for anchoring said tubular member within a cut throat of an animal under slaughter procedure, said anchoring means being reciprocably mounted on said tubular member adjacent said first open end portion, means for position controlling said anchoring means, and said second open end portion being connectable to a suction source.

13. The combined slaughtering and blood extracting device as claimed in claim 12, wherein each wedge bracket member is rod-like shaped and defines a hollow space between the blade and the wedge bracket member itself.

14. The combined slaughtering and blood extracting device as claimed in claim 12, comprising only a pair of said wedge bracket members, defining a plane substantially perpendicular to said vein cutting blade and each of said wedge bracket members is rod-like shaped and defines a hollow space between the blade and the pertinent wedge bracket member itself.

References Cited by the Examiner

UNITED STATES PATENTS

| | | | |
|---|---|---|---|
| 1,380,447 | 6/1921 | Wescott | 17—1 |
| 1,472,378 | 10/1923 | Wescott | 17—1 |
| 1,675,856 | 5/1928 | Kreft | 17—1 |
| 1,804,042 | 5/1931 | Wescott | 99—21 |
| 2,178,129 | 10/1939 | Wilson | 17—1 |

SAMUEL KOREN, *Primary Examiner.*

LUCIE H. LAUDENSLAGER, *Examiner.*